United States Patent
Nobusawa et al.

(10) Patent No.: US 9,820,227 B2
(45) Date of Patent: Nov. 14, 2017

(54) PROGRAM AND BASE STATION APPARATUS

(71) Applicant: Sharp Kabushiki Kaisha, Osaka-shi, Osaka (JP)

(72) Inventors: Yuichi Nobusawa, Osaka (JP); Shinichi Sawada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 36 days.

(21) Appl. No.: 14/905,473

(22) PCT Filed: Jul. 28, 2014

(86) PCT No.: PCT/JP2014/069865
§ 371 (c)(1),
(2) Date: Jan. 15, 2016

(87) PCT Pub. No.: WO2015/029668
PCT Pub. Date: Mar. 5, 2015

(65) Prior Publication Data
US 2016/0286486 A1    Sep. 29, 2016

(30) Foreign Application Priority Data

Aug. 30, 2013  (JP) ................................ 2013-180288

(51) Int. Cl.
*H04W 52/02*        (2009.01)
*H04W 76/04*        (2009.01)
(Continued)

(52) U.S. Cl.
CPC ..... *H04W 52/0216* (2013.01); *H04W 72/042* (2013.01); *H04W 72/1273* (2013.01);
(Continued)

(58) Field of Classification Search
CPC . H04W 52/0216; H04W 76/04; H04W 76/06; H04W 72/042; H04W 72/1273; H04W 76/02; H04W 76/048; Y02B 60/50
See application file for complete search history.

(56) References Cited

U.S. PATENT DOCUMENTS 8,060,768 B2 * 11/2011 Tsai ...................... G06F 1/3218
713/323
2009/0238105 A1 * 9/2009 Wu .................... H04W 52/0216
370/311

(Continued)

FOREIGN PATENT DOCUMENTS

JP       2010-044732 A    2/2010
WO    2013/039146 A1    3/2013

OTHER PUBLICATIONS

Intel Corporation; "UE and eNB Behavior for Power Preference Indication"; 3GPP TSG RAN WG2 Meeting #81; R2-130559; Jan. 28-Feb. 1, 2013; 4 pages.

(Continued)

*Primary Examiner* — Ajay Cattungal
(74) *Attorney, Agent, or Firm* — Keating & Bennett, LLP

(57) ABSTRACT

The power consumption of a mobile station is reduced according to the conditions of use by a user without stopping packet communication necessary for the user. In a program for a base station apparatus, a request for establishing radio connection and information indicating the conditions of use of the mobile station apparatus are acquired from the mobile station apparatus (step S1). When the information indicating the conditions of use indicates the use of the mobile station apparatus, a first timer is set for a relatively long time whereas when the information indicating the conditions of use indicates the non-use of the mobile station apparatus, the first timer is set for a relatively short time. When the transmission of a packet to the mobile station apparatus is (Continued)

completed (step S4), the first timer is started up (steps S6 and S7), and when the first timer expires, a control signal is transmitted to the mobile station apparatus (step S8) to interrupt the radio connection to the mobile station apparatus (step S11).

6 Claims, 13 Drawing Sheets

(51) Int. Cl.
    *H04W 76/06*     (2009.01)
    *H04W 72/04*     (2009.01)
    *H04W 72/12*     (2009.01)
    *H04W 76/02*     (2009.01)

(52) U.S. Cl.
    CPC ............ *H04W 76/02* (2013.01); *H04W 76/04* (2013.01); *H04W 76/048* (2013.01); *H04W 76/06* (2013.01); *Y02B 60/50* (2013.01)

(56) References Cited

U.S. PATENT DOCUMENTS

| | | | |
|---|---|---|---|
| 2010/0042856 A1 | 2/2010 | Tsai et al. | |
| 2013/0286848 A1* | 10/2013 | Xu | H04W 52/0225 370/241 |
| 2014/0066067 A1* | 3/2014 | Karri | H04W 36/0022 455/436 |
| 2014/0198699 A1* | 7/2014 | Makharia | H04W 52/0216 370/311 |
| 2014/0301373 A1* | 10/2014 | Cili | H04W 76/048 370/336 |
| 2014/0321272 A1* | 10/2014 | Bangolae | H04W 36/0066 370/230 |
| 2017/0127454 A1* | 5/2017 | Xu | H04W 74/0833 |

OTHER PUBLICATIONS

Intel; "Clarifying the Impact of PPI on QoS"; 3GPP TSG RAN WG2 Meeting #80; R2-125751; Nov. 12-15, 2012; 4 pages.
China Unicorn; "UE Assistant Information for Uplink Resource Release"; 3GPP TSG-RAN WG2 Meeting #78; R2-122431; May 21-25, 2012; p. 1-3.
China Unicorn; "Further Consideration on UE Assistant Information for Uplink Resource Release"; 3GPP TSG RAN WG2 Meeting #79; R2-123517; Aug. 13-17, 2012; pp. 1-3.
Official Communication issued in International Patent Application No. PCT/JP2014/069865, dated Oct. 7, 2014.
Ericsson et al., "Discussion on UE mobility assistance information", 3GPP TSG-RAN WG2 #79, Tdoc R2-124038, Aug. 13-17, 2012, pp. 1-8.
LG Electronics Inc., "Discussion on Assistance Information", 3GPP TSG-RAN WG2 #77bis, R1-121313, Mar. 26-30, 2012, pp. 1-3.
Huawai et al., "Further analysis on the usage of the PPI to save UE power", 3GPP TSG RAN WG2 Meeting #82, R1-131975, May 20-24, 2013, 7 pages.

* cited by examiner

| UPLINK TRANSMISSION MODE | COMMON SEARCH SPACE | | | MOBILE STATION APPARATUS SPECIFIC SEARCH SPACE | | |
|---|---|---|---|---|---|---|
| | FORMAT | RNTI | OCC | FORMAT | RNTI | OCC |
| MODE 1 | DCI FORMAT 0 | C-RNTI | INVALID | DCI FORMAT 0 | C-RNTI | INVALID |
| | | SPS C-RNTI | | | SPS C-RNTI | |
| | | T C-RNTI | | | | |
| MODE 2 | DCI FORMAT 0 | C-RNTI | VALID | DCI FORMAT 0, DCI FORMAT 0A | C-RNTI | VALID |
| | | SPS C-RNTI | VALID ONLY FOR RETRANSMISSION | | SPS C-RNTI | VALID ONLY FOR RETRANSMISSION |
| | | T C-RNTI | INVALID | | | |

FIG.5

| CYCLIC SHIFT INFORMATION | CYCLIC SHIFT |
| --- | --- |
| 000 | 0 |
| 001 | 6 |
| 010 | 3 |
| 011 | 4 |
| 100 | 2 |
| 101 | 8 |
| 110 | 10 |
| 111 | 9 |

FIG.6

| CYCLIC SHIFT INFORMATION | CYCLIC SHIFT | OCC |
|---|---|---|
| 000 | 0 | [1,1] |
| 001 | 6 | [1,1] |
| 010 | 3 | [1,-1] |
| 011 | 4 | [1,1] |
| 100 | 2 | [1,-1] |
| 101 | 8 | [1,-1] |
| 110 | 10 | [1,1] |
| 111 | 9 | [1,-1] |

FIG.7

| UPLINK TRANSMISSION MODE | COMMON SEARCH SPACE | | | MOBILE STATION APPARATUS SPECIFIC SEARCH SPACE | | |
|---|---|---|---|---|---|---|
| | FORMAT | RNTI | OCC | FORMAT | RNTI | OCC |
| MODE 1 | DCI FORMAT 0 | C-RNTI | INVALID | DCI FORMAT 0 | C-RNTI | INVALID |
| | | SPS C-RNTI | | | SPS C-RNTI | VALID |
| | | T C-RNTI | | | | |
| MODE 2 | DCI FORMAT 0 | C-RNTI | INVALID | DCI FORMAT 0, DCI FORMAT 0A | C-RNTI | VALID |
| | | SPS C-RNTI | | | SPS C-RNTI | VALID ONLY FOR RETRANSMISSION |
| | | T C-RNTI | | | | |

FIG.10

PROGRAM AND BASE STATION APPARATUS

TECHNICAL FIELD

The present invention relates to a technology for reducing power consumption according to conditions of use of a mobile station apparatus.

BACKGROUND ART

Conventionally, in LTE (Long Term Evolution), as the state of a mobile station apparatus, two states, that is, an "RRC CONNECTED state" and an "RRC IDLE state" are defined. The "RRC" here is an abbreviation for "Radio Resource Control".

The features of the "RRC CONNECTED state" are as follows.
- Radio connection is established between a mobile station and a base station, and packet communication can be performed.
- A radio resource for performing the packet communication from the base station is allocated, and a notification is provided by a PDCCH.
- Since in order to maintain radio connection in a time other than the time during which the power consumption is performed, the PDCCH is continuously received, power consumption is high.

On the other hand, the features of the "RRC IDLE state" are as follows.
- The radio connection is not established between the mobile station and the base station, and the packet communication cannot be performed.
- When the packet communication is performed, the radio connection is established, and it is necessary to make transition to the "RRC CONNECTED state".
- Paging (incoming information) from the base station is intermittently received.
- Power consumption is low.

When the mobile station performs the packet communication, the radio connection to the base station is established, and the packet communication is performed in the "RRC CONNECTED state". Even after the completion of the packet communication, in order to prepare for the subsequent packet communication, the radio connection is maintained for a given period of time in the "RRC CONNECTED state". Then, when the state of non-communication is continued for the given period of time, in order to increase the efficiency of the radio resource and to lower the power consumption of the mobile station, the radio connection is interrupted, and the state is made transition to the "RRC IDLE state".

When as described above, the mobile station is made state transition between the "RRC CONNECTED state" and the "RRC IDLE state", a plurality of control signals is exchanged between the mobile station and the base station. When the mobile station frequently repeats the state transition, a large number of control signals are generated, and thus a large load is placed on a network. Hence, it is necessary to minimize the number of control signal for the mobile station.

Hence, a technology disclosed in patent literature 1 proposes that the function of detecting whether or not the packet communication transmitted and received by the mobile station is present is provided in the base station, and that when the packet communication is not performed for a given period of time after the completion of the packet communication, the mobile station is made transition to the "RRC IDLE state".

CITATION LIST

Patent Literature

PTL 1: International Publication No. WO2013/039146
PTL 2: Japanese Patent Laid-Open No. 2010-044732

DISCLOSURE OF THE INVENTION

However, in the given period of time during which whether or not the packet communication is present is measured, the mobile station maintains the "RRC CONNECTED state". As described above, the "RRC CONNECTED state" is the state where a large amount of power is consumed, and the remaining amount of battery in the mobile station may be reduced quickly by maintaining the "RRC CONNECTED state" for the given period of time. In particular, when a user does not use the mobile station, it is unlikely that the packet communication continuously occurs, with the result that it is highly likely that the given period of time during which a large amount of power is consumed becomes useless.

The present invention is made in view of the foregoing situation, and an object of the present invention is to provide a program and a base station apparatus that can reduce the power consumption of a mobile station according to the conditions of use by a user without stopping the packet communication necessary for the user.

In order to achieve the above object, in the present invention, the following measures are made. Specifically, according to the present invention, there is provided a program for a base station apparatus that performs radio communication with a mobile station apparatus, the program causing a computer to execute a series of processing steps including:
- acquiring, from the mobile station apparatus, a request for establishing radio connection and information indicating conditions of use of the mobile station apparatus;
- setting, a first timer for a relatively long time, when the information indicating the conditions of use of the mobile station apparatus, and setting the first timer for a relatively short time, when the information indicating the conditions of use indicates non-use of the mobile station apparatus; and
- starting up the first timer, when transmission of a packet to the mobile station apparatus is completed, and transmitting a control signal to the mobile station at the time when the first timer expires to interrupt the radio connections to the mobile station apparatus.

Since as described above, when the information indicating the conditions of use indicates the use of the mobile station apparatus, the first timer is set for a relatively long time whereas when the information indicating the conditions of use indicates the non-use of the mobile station apparatus, the first timer is set for a relatively short time, and when the communication of a packet with the mobile station apparatus is completed, the first timer is started up, and when the first timer expires, the control signal is transmitted to the mobile station apparatus to interrupt the radio connection to the mobile station apparatus, when the information indicating the conditions of use of the mobile station apparatus indicates the use of the mobile station apparatus, it is possible to maintain the radio connection for the subsequent packet communication. On the other hand, when the information indicating the conditions of use indicates the non-use of the mobile station apparatus, since the user does not use the mobile station apparatus, and the packet communication is unlikely to continuously occur, the radio connection time is reduced, and thus it is possible to reduce the power consumption of the mobile station apparatus.

According to the present invention, there is provided a program for a base station apparatus that performs radio communication with a mobile station apparatus, the program causing a computer to execute a series of processing steps including:

acquiring, from the mobile station apparatus, a request for establishing radio connection and information indicating conditions of use of the mobile station apparatus;

setting, a second timer determining timing with which C-DRX (CONNECTED Discontinuous Reception) is started for a relatively long time, when the information indicating the conditions of use indicates use of the mobile station apparatus, and setting the second timer for a relatively short time, when the information indicating the conditions of use indicates non-use of the mobile station apparatus; and starting up the second timer, when transmission of a packet to the mobile station apparatus is completed, and transmitting a control signal intermittently at the timing when the second timer expires.

Since as described above, when the information indicating the conditions of use indicates the use of the mobile station apparatus, the second timer determining timing with which the C-DRX (CONNECTED Discontinuous Reception) is started is set for a relatively long time whereas when the information indicating the conditions of use indicates the non-use of the mobile station apparatus, the second timer is set for a relatively short time, and when the communication of a packet with the mobile station apparatus is completed, the second timer is started up, and when the second timer expires, the control signal is intermittently transmitted, when the information indicating the conditions of use indicates the use of the mobile station apparatus, it is possible to maintain the radio connection for the subsequent packet communication. On the other hand, when the information indicating the conditions of use indicates the non-use of the mobile station apparatus, since the user does not use the mobile station apparatus, and the packet communication is unlikely to continuously occur, the mobile station apparatus is made to start the C-DRX (CONNECTED Discontinuous Reception) earlier, and thus it is possible to reduce the power consumption of the mobile station apparatus.

Advantageous Effects of Invention

In the present invention, it is possible to reduce the power consumption of the mobile station according to the conditions of use by the user without stopping the packet communication necessary for the user.

BRIEF DESCRIPTION OF THE DRAWINGS

FIG. 5 is a state of power consumption in the present embodiment when the mobile station which is not used by the user performs the packet communication.

FIG. 6 is a diagram showing the state of power consumption in the conventional technology when the mobile station which is not used by the user performs the packet communication.

FIG. 7 is a diagram showing the state of power consumption in the present embodiment when the mobile station which is not used by the user performs the packet communication.

FIG. 10 is a flowchart showing the operation of the base station according to the present embodiment.

BEST MODES FOR CARRYING OUT THE INVENTION

In the present embodiment, a description will be given using an example where a mobile station (UE) and a base station (eNodeB) of a LTE (Long Term Evolution) system in a 3GPP (3rd Generation Partnership Project) standard are used.

Figure 12:
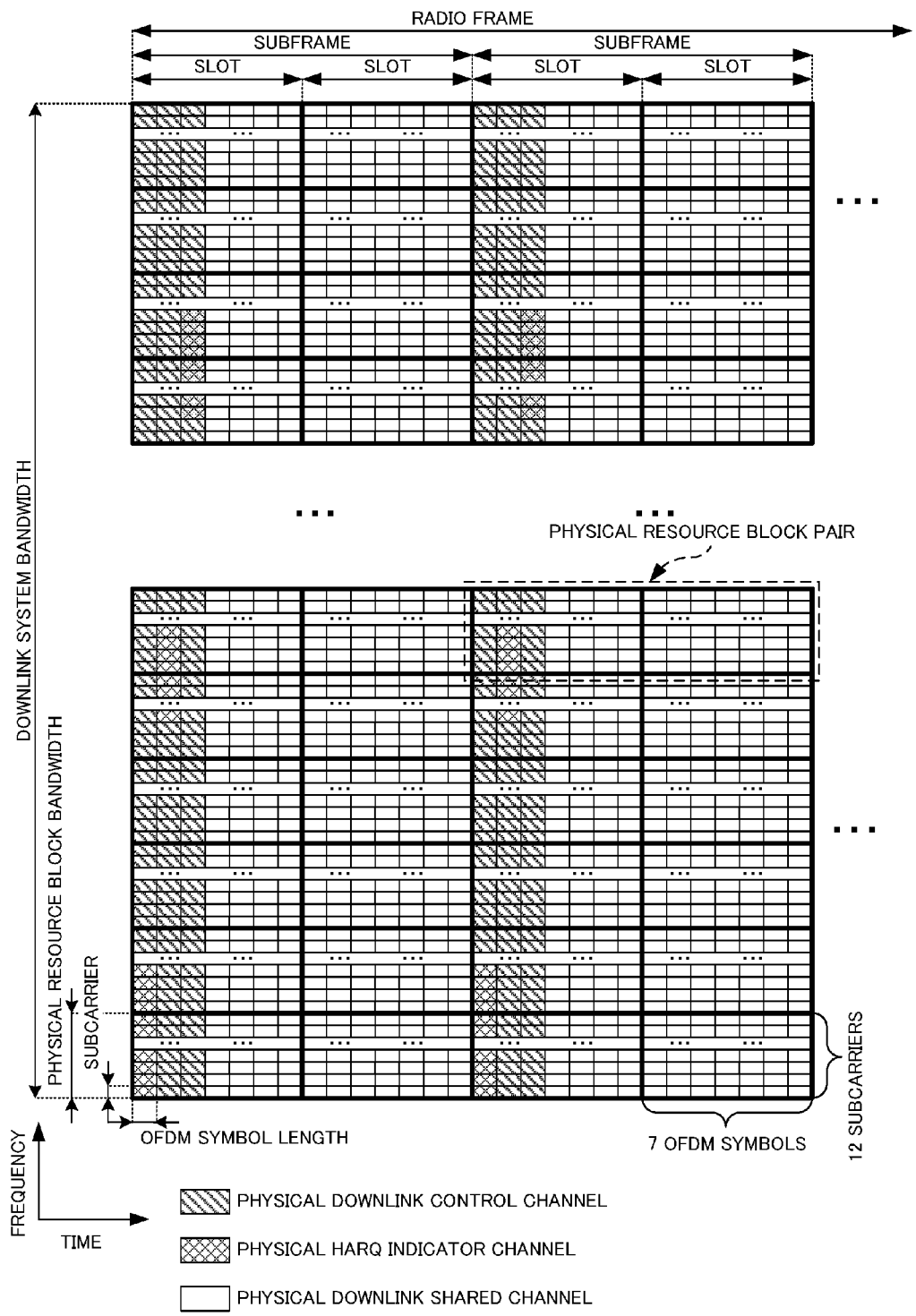
FIG. 12 is a block diagram of a base station apparatus according to the present embodiment.

FIG. 12 is a block diagram of a base station apparatus according to the present embodiment. In a base station apparatus 10, a radio communication portion 11 acquires, from a mobile station apparatus, a request for establishing radio connection and information indicating conditions of use of the mobile station apparatus. When the information which is acquired from the mobile station apparatus and which indicates the conditions of use indicates the use of the mobile station apparatus, a timer setting portion 13 sets a timer 17 for a relatively long time whereas when the information indicating the conditions of use indicates non-use of the mobile station apparatus, the timer setting portion 13 sets the timer 17 for a relatively short time. When the transmission of a packet to the mobile station apparatus is completed, a radio control portion 15 starts up the timer 17, and when the timer 17 expires, the radio control portion 15 transmits a control signal to the mobile station apparatus to interrupt the radio connection to the mobile station apparatus. The timer 17 forms a first timer, a second timer and a third timer. These constituent elements transmit and receive data to and from each other through a control bus 19.

Figure 13:
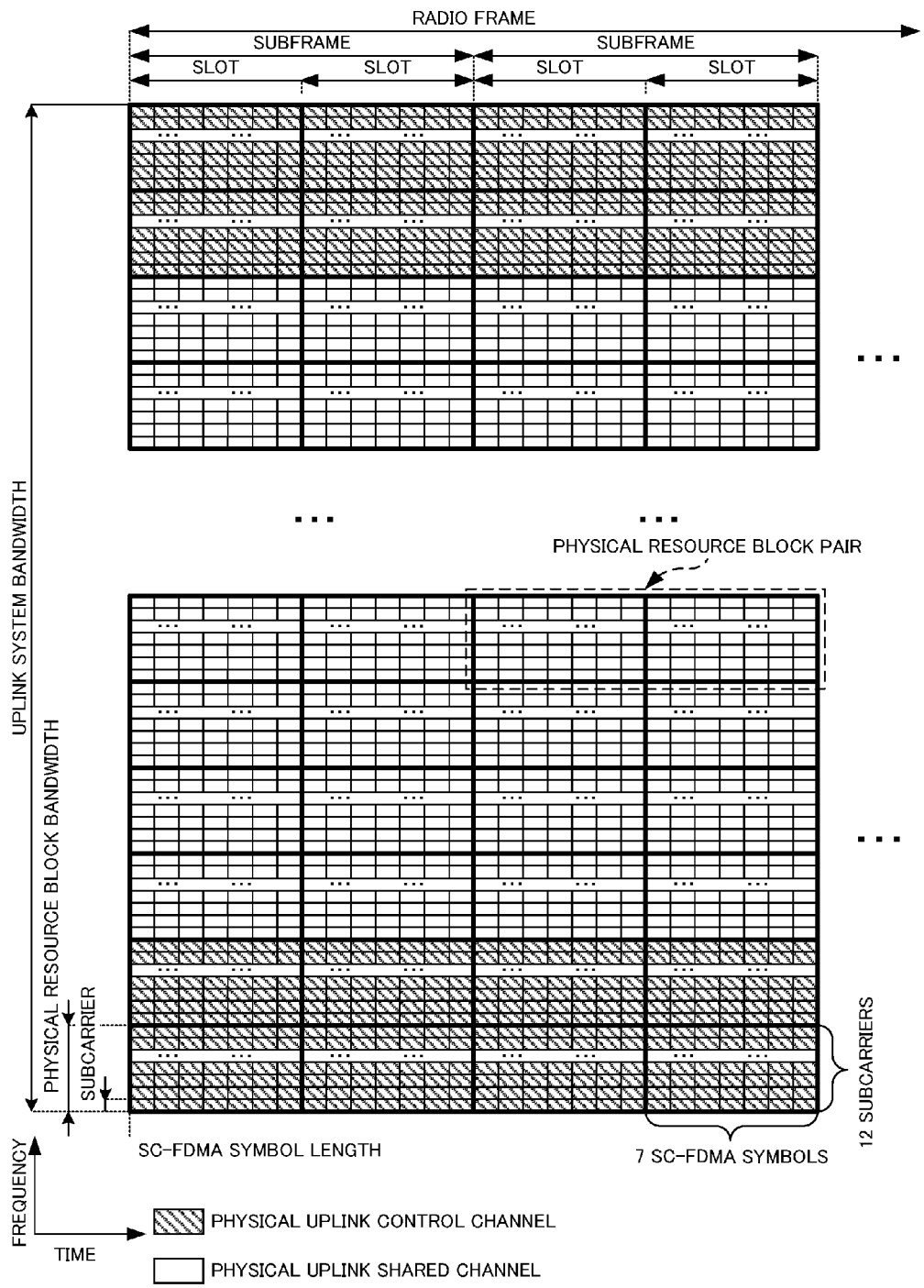
FIG. 13 is a block diagram of a mobile station apparatus according to the present embodiment.

FIG. 13 is a block diagram of the mobile station apparatus according to the present embodiment. In the mobile station apparatus 20, a use condition determination portion 21 determines the conditions of use of the apparatus by the user. A notification portion 23 notifies the base station apparatus of the request for establishing the radio connection and the information for indicating the conditions of use. A control portion 25 receives the control signal from the base station apparatus to make transition to an idle state. These constituent elements transmit and receive data to and from each other through a control bus 27.

First Embodiment

Figure 1:
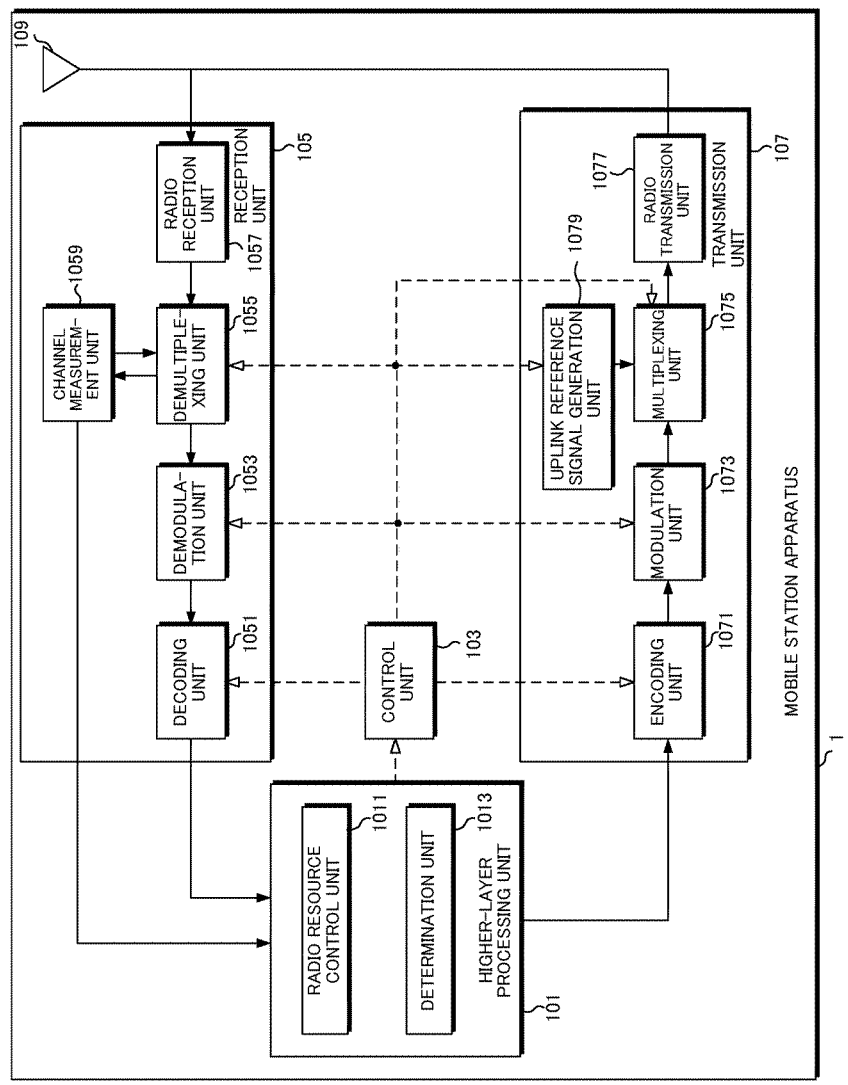
FIG. 1 is a sequence chart showing an operation of a mobile station and a base station according to a first embodiment.

FIG. 1 is a sequence chart showing the operation of a mobile station and a base station according to a first embodiment. When packet communication is started, the mobile station notifies the conditions of use of the mobile station by the user to the base station. The base station determines, according to the conditions of use by the user, the time during which the radio connection is maintained. In FIG. 1, when packet data is generated (1), the UE (mobile station) determines the conditions of use of the mobile station by the user, that is, whether the mobile station is "used" or the mobile station is "not used" (2). Specifically, a state where a display is turned on and a state where a sound is output are checked.

As a result of the checking, when the display is turned on or the sound is turned on, it is determined that the mobile station is used by the user (in use). On the other hand, when the display is turned off and the sound is turned off, it is determined that the mobile station is not used by the user (non-use). Then, in order to establish the radio connection, the mobile station transmits an "RRC Connection Request" to the base station (3). In the present embodiment, information (in use/non-use) on the state of use of the mobile station is included in this message, and the information is notified to the base station.

The base station notifies an "RRC Connection Setup" to the mobile station to notify information necessary for establishing the radio connection (4). The mobile station transmits an "RRC Connection Setup Complete" to the base station to establish the radio connection, and makes transition to an "RRC CONNECTED state" (5).

The mobile station performs the packet communication (6). After the completion of the packet communication, the base station starts a "Release Timer" corresponding to the conditions of use of the mobile station (7). Here, the "Release Timer" refers to a timer for the time during which the base station maintains the radio connection to the mobile station after the completion of the packet communication. After the completion of the packet communication, counting is started, and when the timer expires, an "RRC Connection Release" is transmitted to the mobile station, and the radio connection to the mobile station is interrupted.

When the mobile station is "used", the base station starts a "Long Release timer". On the other hand, when the mobile station is "not used", the base station starts a "Short Release Timer". Here, the "Short Release Timer" is set at a value shorter than the "Long Release Timer". For example, the "Long Release Timer" is set at 10 seconds, and the "Short Release Timer" is set at 2 seconds (can be set at 0 seconds). The timer is set as described above, and thus when the mobile station is "used", even after the completion of the packet communication, the radio connection is maintained long whereas when the mobile station is "not used", after the completion of the packet communication, the radio connection can be interrupted immediately.

Until the "Release Timer" expires, the base station transmits a PDCCH to the mobile station so that the base station maintains the radio connection to the mobile station (8). Here, the PDCCH (Physical Dedicated Control Channel) refers to a control channel along which the base station can notify the mobile station of the allocation information of the radio resource so that the base station maintains the radio connection to the mobile station.

When the "Release Timer" expires (9), the base station transmits the "RRC Connection Release" to the mobile station to interrupt the radio connection (10). The mobile station makes transition to an "RRC IDLE state".

<Variation>

Although in the first embodiment, in the (2) of FIG. 1, the conditions of use by the user are determined by the state of the display and the state of the output of the sound, the present invention is not limited to this configuration. Alternatively, the conditions of use by the user may be determined by the state of detection by an acceleration sensor, the state of vibration or the like.

Figure 3:
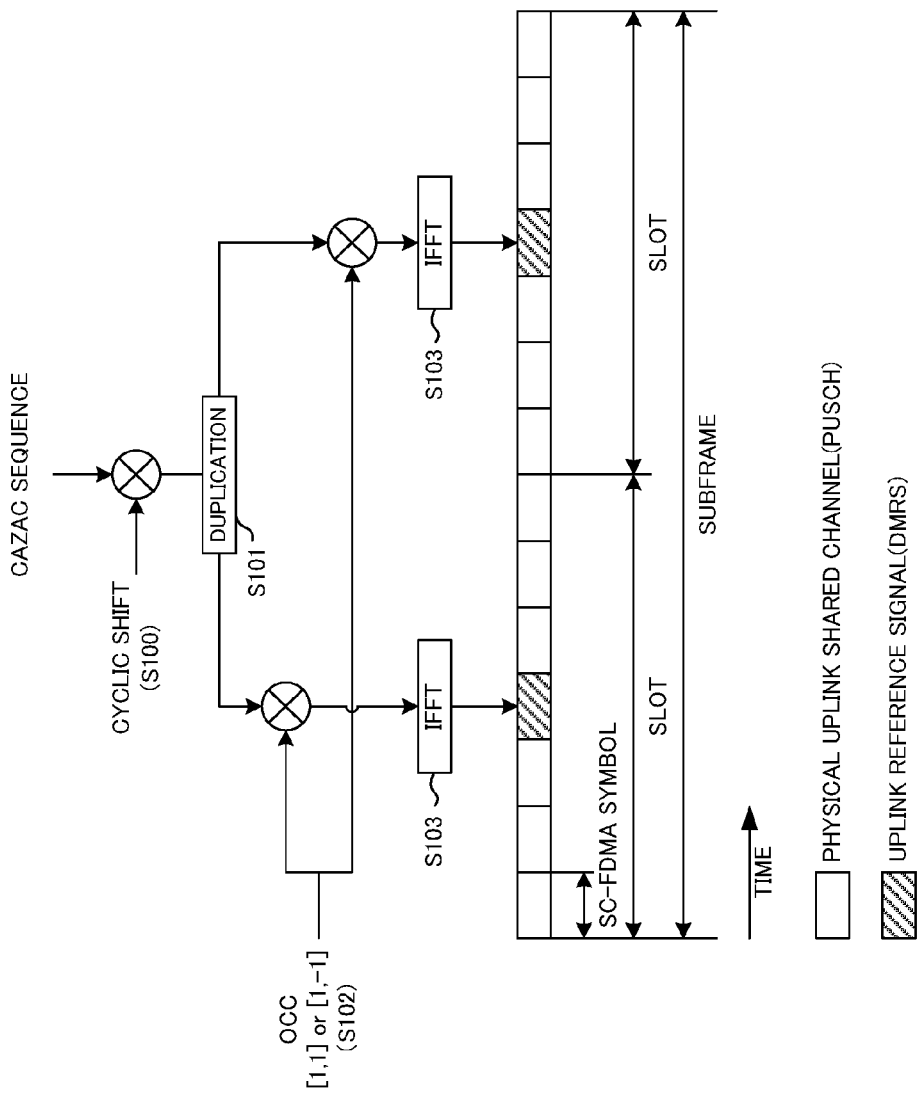
FIG. 3 is a flowchart showing an operation of the base station according to the present embodiment.

FIG. 3 is a flowchart showing the operation of the base station according to the present embodiment. In FIG. 3, the "RRC Connection Request" including information on the conditions of use is received from the mobile station (step S1). Then, the "RRC Connection Setup" is transmitted to the mobile station to make transition the mobile station to the "RRC CONNECTED state" (step S2). Then, the packet communication with the mobile station is performed (step S3), and when the packet communication is completed (step S4), the conditions of use of the mobile station by the user is determined, and the "Release Timer" corresponding to the state of use of the mobile station is started (step S5). Specifically, when in step S5, the mobile station is "used", the "Long Release Timer" of 300 seconds is started (step S7). On the other hand, when in step S5, the mobile station is "not used", the "Short Release Timer" of 5 seconds is started (step S6).

Until the "Release Timer" is completed, the base station transmits, to the mobile station, the PDCCH for notifying the schedule information of radio resource allocation (step S8). In the meantime, whether or not the packet communication with the mobile station is newly performed is determined (step S9), and when the packet communication with the mobile station is newly performed, the process is made transition to step S2, the "Release Timer" is reset again and the "Release Timer" is started again after the completion of the packet communication. On the other hand, when in step S9, the packet communication is not newly performed, whether or not the "Release Timer" expires is determined (step S10), and when the "Release Timer" does not expire, the process is made transition to step S8. When the "Release Timer" expires, the "RRC Connection Release" is transmitted to the mobile station, the mobile station is made transition to the "RRC IDLE state" (step S11) and the process is completed.

Figure 4:
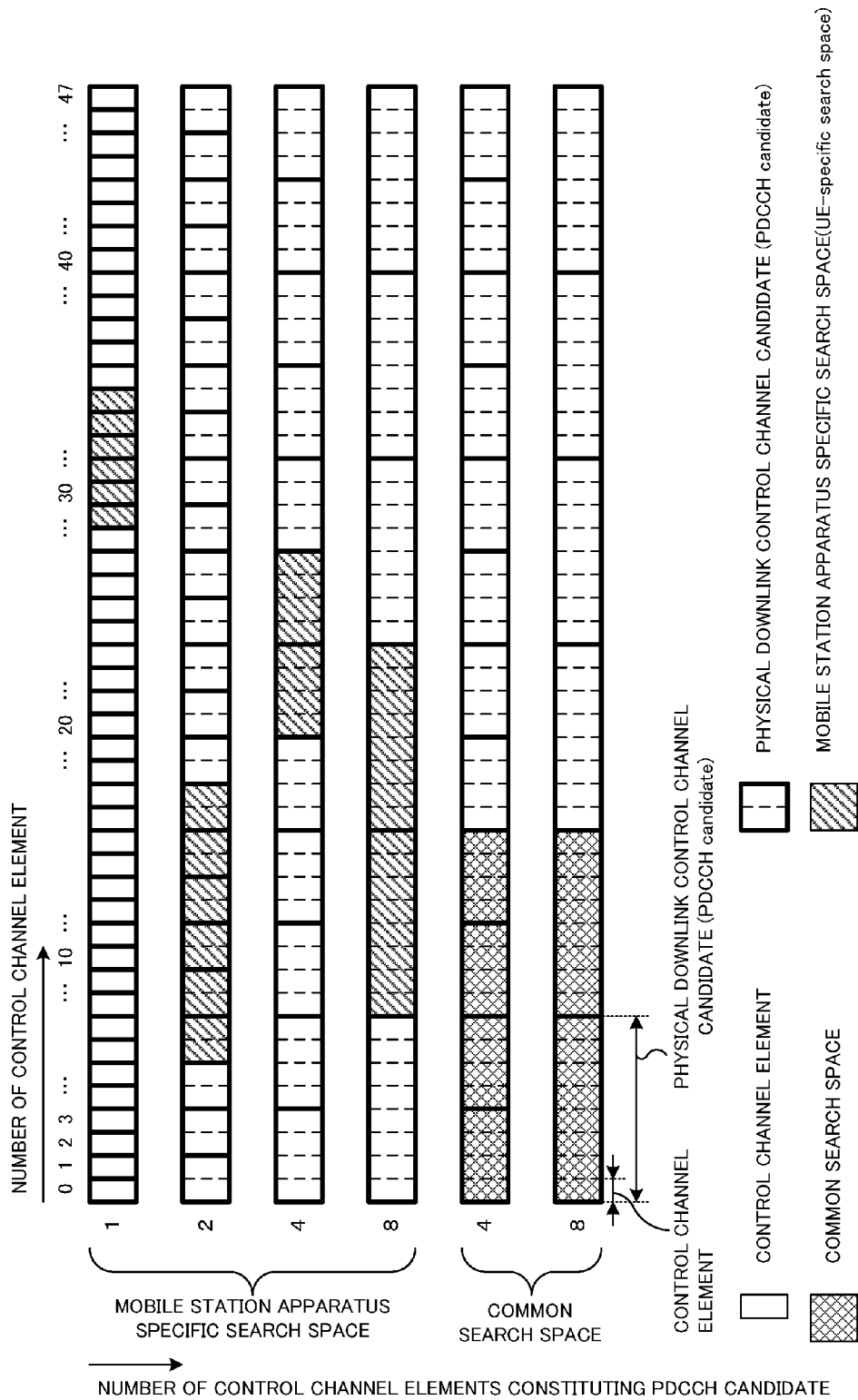
FIG. 4 is a state of power consumption in a conventional technology when a mobile station which is not used by the user performs packet communication.

FIG. 4 is a state of power consumption in a conventional technology when the mobile station which is not used by the user performs the packet communication. FIG. 5 is a state of power consumption in the present embodiment when the mobile station which is not used by the user performs the packet communication. As is clear from the comparison between FIGS. 4 and 5, in the present embodiment, the time during which the radio connection after the packet communication is maintained is reduced, and thus it is possible to reduce the power consumption of the mobile station. In other words, it is possible to reduce the power consumption of the mobile station according to the conditions of use of the mobile station by the user.

Second Embodiment

In the LTE system of the 3GPP standard, in order to reduce the power consumption of the mobile station in the "RRC CONNECTED state", C-DRX (CONNECTED Discontinuous Reception, hereinafter referred to as "CDRX") is standardized as an option. Although in general, the mobile station in the "RRC CONNECTED state" continuously receives the PDCCH, the mobile station in the "CDRX state" starts up a reception circuit at regular intervals to receive the PDCCH, and stops the reception circuit in the other time. In other words, the CDRX is a function of intermittently receiving the PDCCH. In this way, even in a state (state where the packet communication can be performed) where the radio resource is allocated from the base station, it is possible to reduce the power consumption.

In the present embodiment, when the packet communication is started, the mobile station notifies information on the conditions of use by the user to the base station. The base station corresponding to the CDRX determines, according to the conditions of use of the mobile station by the user, the timing with which the CDRX is started by the mobile station.

Figure 2:
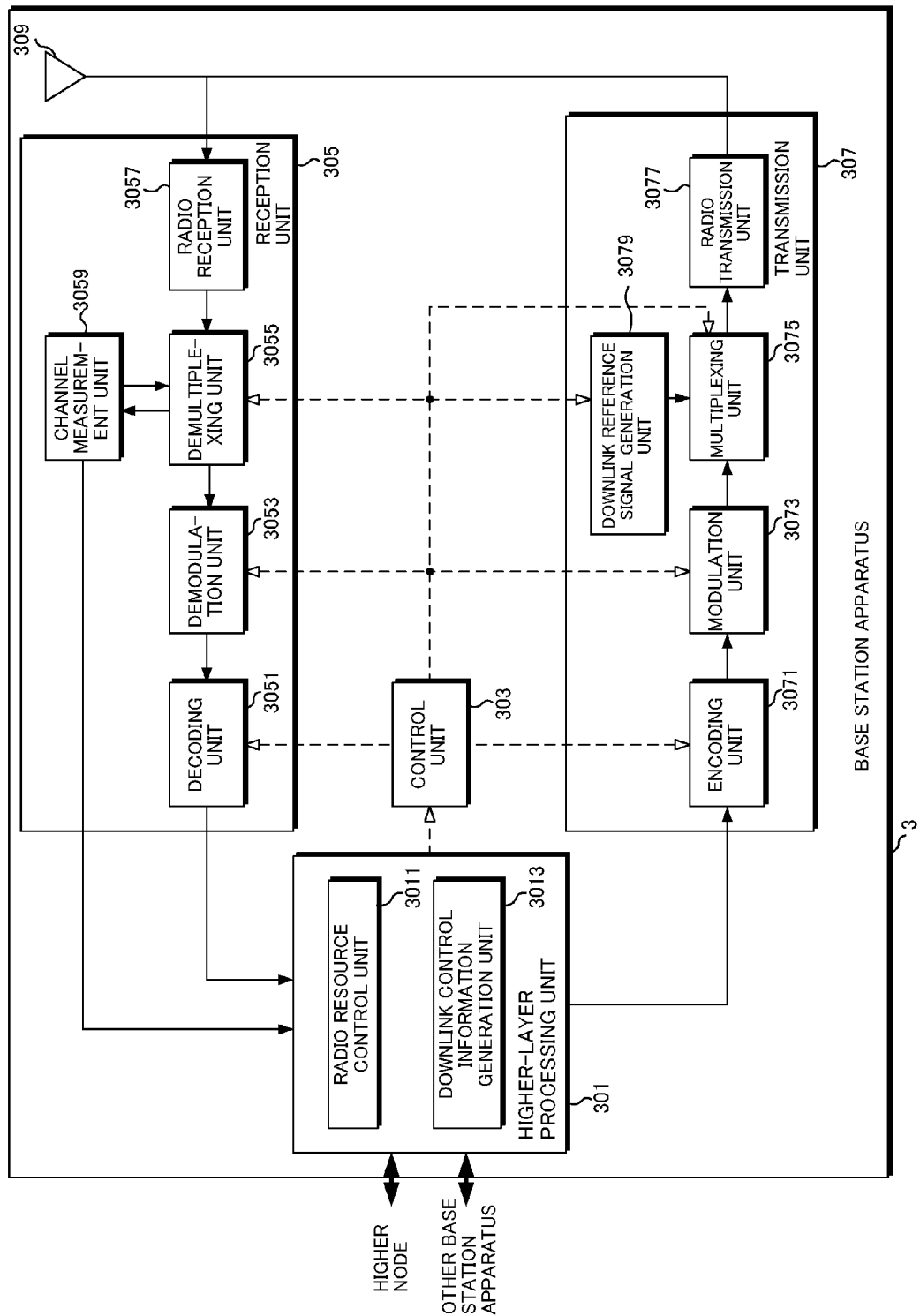
FIG. 2 is a sequence chart showing an operation of a mobile station and a base station according to a second embodiment.

FIG. 2 is a sequence chart showing the operation of a mobile station and a base station according to a second embodiment. When in the mobile station, packet data is generated (1), the mobile station determines the conditions of use by the user, that is, whether the mobile station is "used" or the mobile station is "not used" (2). Specifically, a state where the display of the mobile station is turned on and a state where a sound is output are checked.

As a result of the checking, when the display is turned on or the sound is turned on, the user determines that the mobile station is used and sets the "in use". On the other hand, when the display is turned off and the sound is turned off, the user determines that the mobile station is not used and sets the "non-use".

Then, in order to establish the radio connection, the mobile station transmits the "RRC Connection Request" to the base station (3). In the present embodiment, information (in use/non-use) on the conditions of use by user is included in this message, and the information is notified to the base station. The base station notifies the "RRC Connection Setup" to the mobile station (4) to notify information necessary for establishing the radio connection. The mobile station transmits the "RRC Connection Setup Complete" to the base station (5) to establish the radio connection, and is made transition to the "RRC CONNECTED state".

The base station transmits an "RRC Connection Reconfiguration" (6) to notify a CDRX parameter to the mobile station. The mobile station transmits an "RRC Connection Reconfiguration Complete" (7) to return a response. Then, the mobile station performs the packet communication (8).

After the completion of the packet communication, the base station starts a "CDRX Start Timer" corresponding to the conditions of use by the user (9). When the mobile station is "used", the base station starts a "Long CDRX Start Timer". On the other hand, when the mobile station is "not used", the base station starts a "Short CDRX Start Timer".

Until the "CDRX Start Timer" expires, the base station continuously transmits the PDCCH to the mobile station (10). When the "CDRX Start Timer" expires (11), the base station intermittently transmits the PDCCH to the mobile station (12), and the mobile station starts the CDRX to intermittently receive the PDCCH (13).

FIG. 10 is a flowchart showing the operation of the base station according to the present embodiment. The base station receives the "RRC Connection Request" including information on the conditions of use by the user from the mobile station (step T1). Then, the "RRC Connection Setup" is transmitted to the mobile station to make transition the mobile station to the "RRC CONNECTED state" (step T2). Then, the base station performs the packet communication with the mobile station (step T3). When the packet communication is completed (step T4), the conditions of use by the user is determined (step T5). Specifically, when the user uses the mobile station, that is, when the mobile station is "used", the "Long Release Timer" of 300 seconds is started (step T7). On the other hand, when the user does not use the mobile station, that is, when the mobile station is "not used", the "Short Release Timer" of 5 seconds is started (step T6).

Until the "Release Timer" is completed, the base station transmits, to the mobile station, the PDCCH for notifying the schedule information of radio resource allocation (step T8). In the meantime, whether or not the packet communication with the mobile station is newly performed is determined (step T9), and when the packet communication with the mobile station is newly performed, the process is made transition to step T3, the "Release Timer" is reset again and the "Release Timer" is started again after the completion of the packet communication.

On the other hand, when in step T9, the packet communication is not newly performed, whether or not the "CDRX Start Timer" expires is determined (step T10). When the "CDRX Start Timer" does not expire, the process is made transition to step T8 whereas when the "CDRX Start Timer" expires, the mobile station is made to start the CDRX to intermittently transmit the PDCCH (step T11). After the completion of the CDRX, the "RRC Connection Release" is transmitted to the mobile station to make transition the mobile station to the "RRC IDLE state".

FIG. 6 is a diagram showing a state of power consumption in a conventional technology when the mobile station which is not used by the user performs the packet communication. FIG. 7 is a diagram showing a state of power consumption in the present embodiment when the mobile station which is not used by the user performs the packet communication. As is clear from the comparison between FIGS. 6 and 7, in the present embodiment, after the completion of the packet communication, it is possible to start the CDRX earlier than the conventional technology, with the result that it is possible to reduce the power consumption of the mobile station. In other words, it is possible to reduce the power consumption of the mobile station according to the conditions of use by the user.

Third Embodiment

Even when the user does not use the mobile station the packet communication may frequently occur such as by continuous reception of electronic mail, for example. In the present embodiment, in the mobile station which is not used by the user, after the completion of the packet communication, whether or not the packet communication is present is monitored for a given period of time, and when the packet communication occurs within the given period of time, the time during which the radio connection is maintained is set long.

Figure 11:
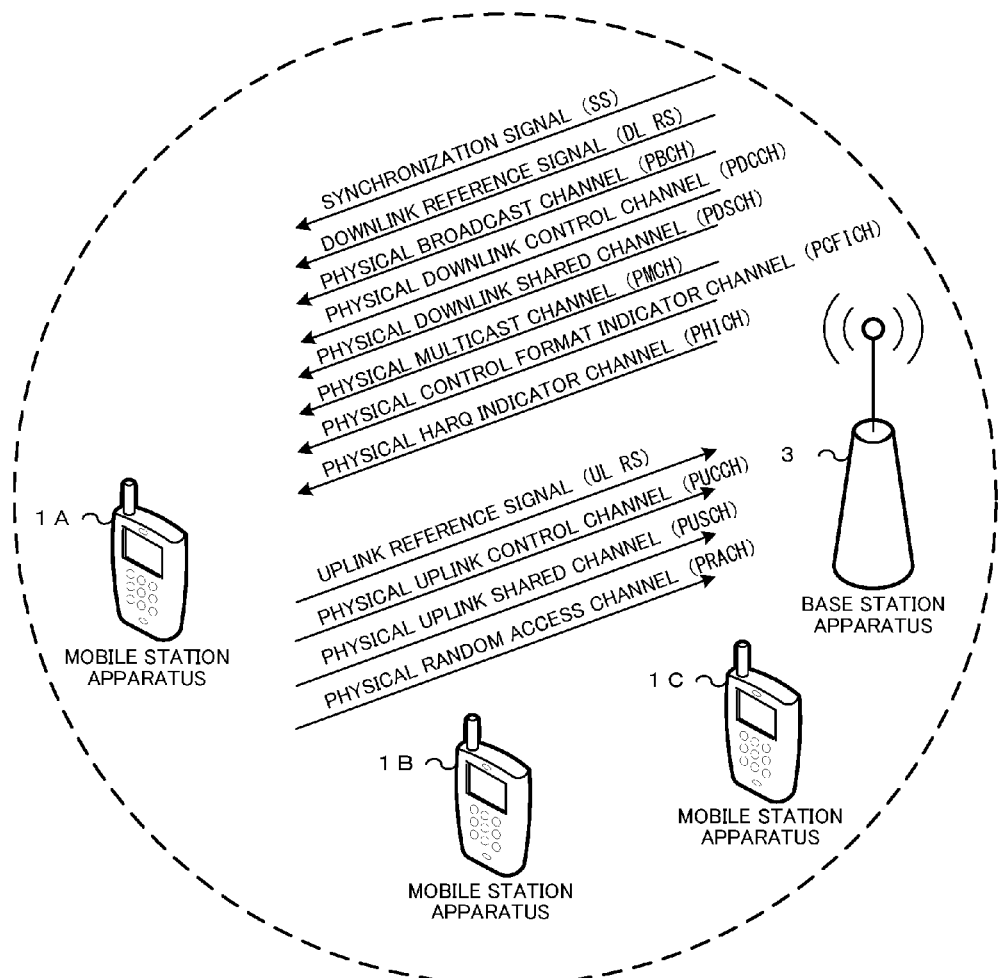
FIG. 11 is a flowchart showing the operation of the base station according to the present embodiment.

FIG. 11 is a flowchart showing the operation of the base station according to the present embodiment. The base station receives the "RRC Connection Request" including information on the conditions of use by the user from the mobile station (step P1). The "RRC Connection Setup" is transmitted to the mobile station to transfer the mobile station to the "RRC CONNECTED state", and thus the radio connection to the mobile station is established (step P2). Then, the base station performs the packet communication with the mobile station (step P3).

When the packet communication is completed (step P4), the base station determines the conditions of use by the user (step P5), and the "Release Timer" corresponding to the conditions of use by the user is started. When the user uses the mobile station, that is, when the mobile station is "used", the "Long Release Timer" of 10 seconds is started (step P8).

On the other hand, when the user does not use the mobile station, that is, when the mobile station is "not used", whether or not a "Monitoring Timer" expires is checked (step P6). Here, the "Monitoring Timer" refers to a timer for preventing the number of state transition from being increased when in the mobile station which is not used by the user, the packet communication frequently occurs. When the packet communication occurs since counting has been started after the completion of the packet communication until the "Monitoring Timer" expires, the time during which the radio connection is maintained after the completion of the packet communication is set long.

When in step P6, the "Monitoring Timer" does not expire, the "Long Release Timer" of 10 seconds is started (step P8). On the other hand, when the "Monitoring Timer" expires, the "Short Release Timer" of 2 seconds is started (step P7). Then, the "Monitoring Timer" is started (step P9).

Until the "Release Timer" is completed, the allocation information of the radio resource is notified by the PDCCH to the mobile station, and the radio connection to the mobile station is maintained (step P10). Then, whether or not the packet communication with the mobile station is newly performed is determined (step P11), and when the packet communication with the mobile station is newly performed, the "Release Timer" is reset (step P14), the process is made transition to step P3, the packet communication is performed and a cycle from step P3 to step P10 is performed.

On the other hand, when in step P11, the packet communication with the mobile station is not newly performed, whether or not the "Release Timer" expires is checked (step P12). When the "Release Timer" does not expire, the process is made transition to step P10 to maintain the radio connection. On the other hand, when in step P12, the "Release Timer" expires, the "RRC Connection Release" is transmitted to the mobile station to interrupt the radio connection (step P13).

Figure 8:
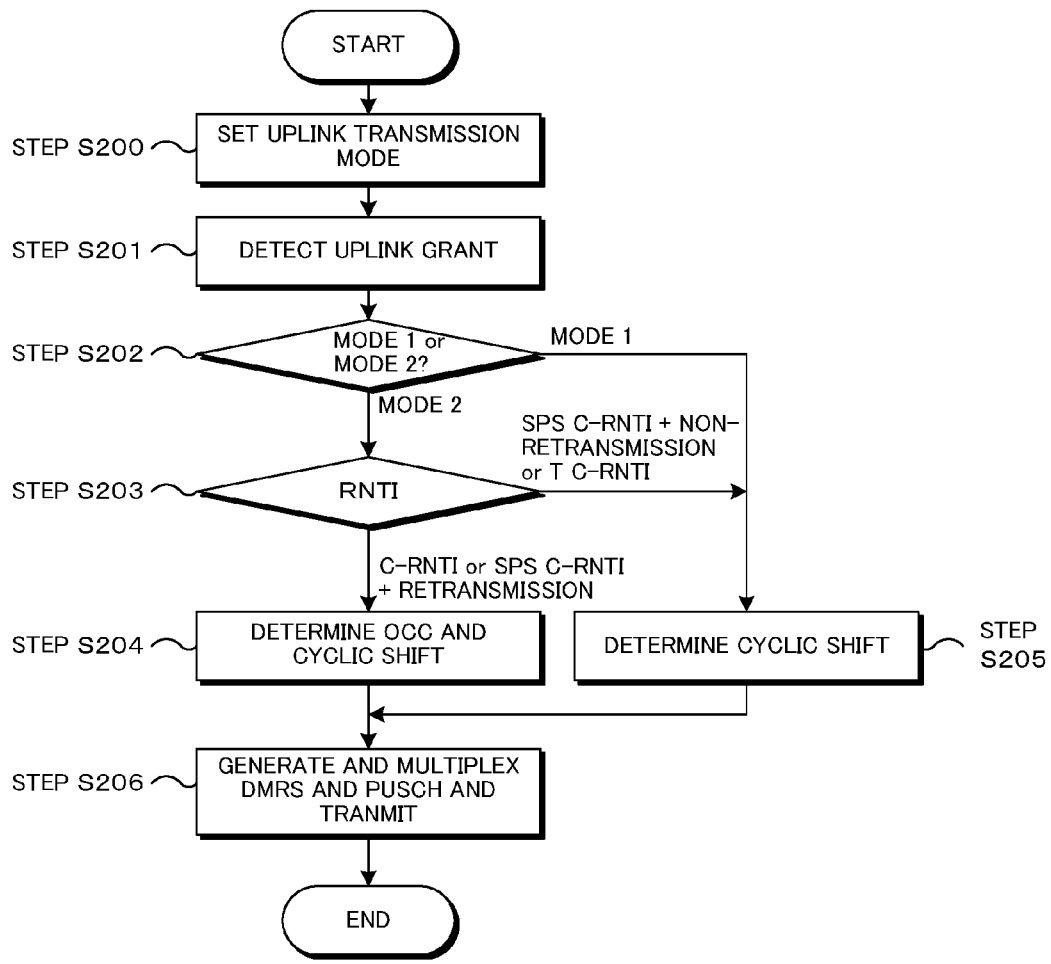
FIG. 8 is a diagram showing the state of power consumption in the conventional technology when the mobile station which is not used by the user frequently performs the packet communication.
Figure 9:
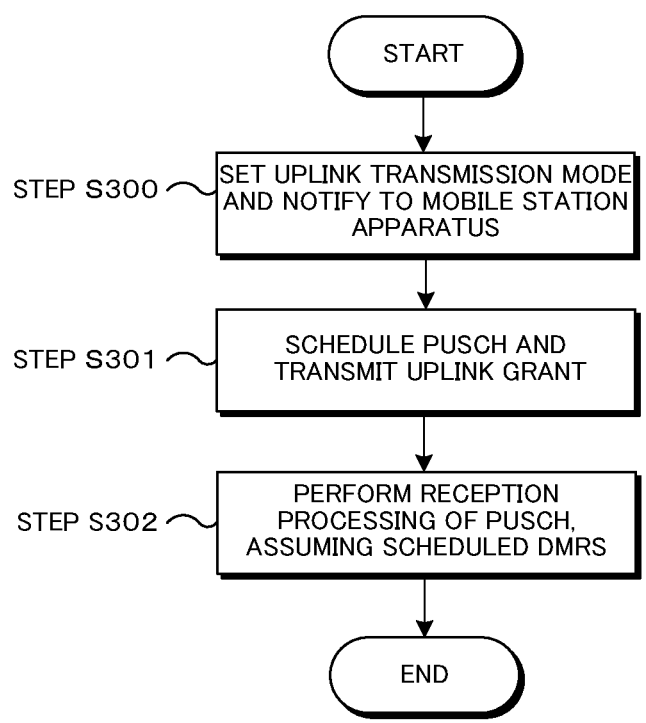
FIG. 9 is a diagram showing the state of power consumption in the present embodiment when the mobile station which is not used by the user frequently performs the packet communication.

FIG. 8 is a diagram showing the state of power consumption in the conventional technology when the mobile station which is not used by the user frequently performs the packet communication. FIG. 9 is a diagram showing the state of power consumption in the present embodiment when the mobile station which is not used by the user frequently performs the packet communication.

In FIG. 9, the packet communication (1) occurs, and after the completion of the packet communication (1), the "Monitoring Timer (1)" is started. Before the "Monitoring Timer (1)" expires, the subsequent packet communication (2) occurs. Since the packet communication (2) occurs before the "Monitoring Timer (1)" expires, the time during which the radio connection is maintained after the completion of the packet communication (2) is set long.

After the completion of the packet communication (2), the "Monitoring Timer (2)" is started. Before the "Monitoring Timer (2)" expires, the subsequent packet communication (3) occurs. Since the packet communication (3) occurs before the "Monitoring Timer (2)" expires, the time during which the radio connection is maintained after the completion of the packet communication (3) is set long.

After the completion of the packet communication (3), the "Monitoring Timer (3)" is started. Before the "Monitoring Timer (3)" expires, the subsequent packet communication (4) occurs. Since the packet communication (4) occurs before the "Monitoring Timer (3)" expires, the time during which the radio connection is maintained after the completion of the packet communication (4) is set long.

After the completion of the packet communication (4), the "Monitoring Timer (4)" is started. After the "Monitoring Timer (4)" expires, the subsequent packet communication (5) occurs. Since the packet communication (5) occurs after the "Monitoring Timer (4)" expires, the time during which the radio connection is maintained after the completion of the packet communication (5) is set short.

As is clear from the comparison between FIGS. 8 and 9, when the packet communication frequently occurs, the time during which the radio connection is maintained is set long whereas when the frequency of the packet communication is reduced, the time during which the radio connection is maintained is set short. In other words, it is possible to reduce the power consumption of the mobile station according to the conditions of use by the user and the conditions of occurrence of the packet communication.

The present invention can adopt such aspects as below. Specifically, according to the present invention, there is provided a program for a base station apparatus that performs radio communication with a mobile station apparatus, the program causing a computer to execute a series of processing steps including:

acquiring, from the mobile station apparatus, a request for establishing radio connection and information indicating conditions of use of the mobile station apparatus;

setting, a first timer for a relatively long time, when the information indicating the conditions of use indicates use of the mobile station apparatus, and setting the first timer for a relatively short time, when the information indicating the conditions of use indicates non-use of the mobile station apparatus; and starting up the first timer, when transmission of a packet to the mobile station apparatus is completed, and transmitting a control signal to the mobile station at the time when the first timer expires to interrupt the radio connections to the mobile station apparatus.

According to the present invention, there is provided a program for a base station apparatus that performs radio communication with a mobile station apparatus, the program causing a computer to execute a series of processing steps including:

acquiring, from the mobile station apparatus, a request for establishing radio connection and information indicating conditions of use of the mobile station apparatus;

setting, a second timer determining timing with which C-DRX (CONNECTED Discontinuous Reception) is started for a relatively long time, when the information indicating the conditions of use indicates use of the mobile station apparatus, and setting the second timer for a relatively short time, when the information indicating the conditions of use indicates non-use of the mobile station apparatus; and starting up the second timer, when transmission of a packet to the mobile station apparatus is completed, and transmitting a control signal intermittently at the timing when the second timer expires.

In the program according to the present invention, the program further including:

setting the first timer for a relatively long time, when the information indicating the conditions of use indicates use of the mobile station apparatus; and determining, when the information indicating the conditions of use indicates non-use of the mobile station apparatus, whether or not a third timer determining a period of time during which occurrence of packet communication is monitored expires, and setting the third timer for a relatively long time, when the third timer does not expire, and setting the third timer for a relatively short time, when the third timer expires.

According to the present invention, there is provided a program for a mobile station apparatus that performs radio communication with a base station apparatus, the program causing a computer to execute a series of processing steps including:

determining conditions of use by a user;
notifying the base station apparatus of a request for establishing radio connection and information indicating the conditions of use; and
receiving a control signal from the base station apparatus to make transition to an idle state subsequently.

According to the present invention, there is provided a radio communication method for a base station apparatus that performs radio communication with a mobile station apparatus, the radio communication method including the steps of:

acquiring, from the mobile station apparatus, a request for establishing radio connection and information indicating conditions of use of the mobile station apparatus;
setting, a first timer for a relatively long time, when the information indicating the conditions of use indicates use of the mobile station apparatus, and setting the first timer for a relatively short time, when the information indicating the conditions of use indicates non-use of the mobile station apparatus; and
starting up the first timer, when transmission of a packet to the mobile station apparatus is completed, and transmitting a control signal to the mobile station at the time when the first timer expires to interrupt the radio connections to the mobile station apparatus.

According to the present invention, there is provided a base station apparatus that performs radio communication with a mobile station apparatus, the base station apparatus including:

a radio communication portion which acquires, from the mobile station apparatus, a request for establishing radio connection and information indicating conditions of use of the mobile station apparatus;
a timer setting portion which sets a first timer for a relatively long time, when the information indicating the conditions of use indicates use of the mobile station apparatus, and sets the first timer for a relatively short time, when the information indicating the conditions of use indicates non-use of the mobile station apparatus; and
a radio control portion which starts up the first timer, at the time when transmission of a packet to the mobile station apparatus is completed, transmits a control signal to the mobile station to interrupt the radio connection to the mobile station apparatus at the time when the first timer expires.

According to the present invention, there is provided a mobile station apparatus that performs radio communication with a base station apparatus, the mobile station apparatus including:

a use condition determination portion which determines the conditions of use of the mobile station apparatus by the user;
a notification portion which notifies the base station apparatus of a request for establishing radio connection and information for indicating the conditions of use; and
a control portion which receives a control signal from the base station apparatus to make transition to an idle state.

In this configuration, it is possible to reduce the power consumption of the mobile station according to the conditions of use by the user without stopping the packet communication necessary for the user.

The present international application claims priority based on Japanese Patent Laid-Open No. 2013-180288 filed on Aug. 30, 2013, the contents of which are hereby incorporated by reference in its entirety.

DESCRIPTION OF SYMBOLS 10 base station apparatus
11 radio communication portion
13 timer setting portion
15 radio control portion
17 timer
19 control bus
20 mobile station apparatus
21 use condition determination portion
23 notification portion
25 control portion
27 control bus
step S5 determination of state of use of mobile station
step S6 start of Short Release Timer
step S7 start of Long Release Timer
step S8 transmission of PDCCH
step S11 RRC Connection Release is transmitted to mobile station, and radio connection is interrupted
step T5 determination of state of use of mobile station
step T6 start of Short Release Timer
step T7 start of Long Release Timer
step T8 transmission of PDCCH
step T11 CDRX is started by mobile station, and PDCCH is intermittently transmitted
step P5 determination of state of use of mobile station
step P6 determination of whether or not Monitoring Timer expires
step P7 start of Short Release Timer
step P8 start of Long Release Timer
step P9 start of Monitoring Timer
step P10 radio connection is maintained
step P12 determination of whether or not Release Timer expires
step P13 RRC Connection Release is transmitted to mobile station, and radio connection is interrupted

The invention claimed is:

1. A base station apparatus that performs radio communication with a mobile station apparatus, the base station apparatus comprising:

a radio communication portion which acquires, from said mobile station apparatus, a request for establishing radio connection and information indicating conditions of use of said mobile station apparatus;
a timer setting portion which:
sets a first timer for a relatively long time, when said information indicating the conditions of use indicates use of said mobile station apparatus,
determines, when said information indicating the conditions of use indicates non-use of said mobile station apparatus whether or not a third timer determining a period of time during which occurrence of packet communication is monitored expires, sets said first timer for a relatively long time, when said third timer does not expire, and sets said first timer for a relatively short time, when said third timer expires; and a radio control portion which starts up said first timer, at the time when transmission of a packet to said mobile station apparatus is completed, transmits a control signal to said mobile station to interrupt the radio connection to said mobile station apparatus at the time when said first timer expires.

2. A communication system comprising:

the base station apparatus according to claim 1; and a mobile station apparatus that performs radio communication with the base station apparatus, wherein the mobile station apparatus includes:
  a use condition determination portion which determines conditions of use by a user;
  a notification portion which notifies said base station apparatus of a request for establishing radio connection and information indicating said conditions of use; and
  a control portion which receives a control signal from said base station apparatus to make transition to an idle state.

3. A base station apparatus that performs radio communication with a mobile station apparatus, the base station apparatus comprising:
  a radio communication portion which acquires, from said mobile station apparatus, a request for establishing radio connection and information indicating conditions of use of said mobile station apparatus;
  a timer setting portion which sets, a second timer determining timing with which C-DRX (CONNECTED Discontinuous Reception) is started for a relatively long time, when said information indicating the conditions of use indicates use of said mobile station apparatus, and determines, when said information indicating the conditions of use indicates non-use of said mobile station apparatus, whether or not a third timer determining a period of time during which occurrence of packet communication is monitored expires, and sets said second timer for a relatively long time, when said third timer does not expire, and sets said second timer for a relatively short time, when said third timer expires; and
  a radio control portion which starts up said second timer, when transmission of a packet to said mobile station apparatus is completed, and transmits a control signal intermittently to said mobile station apparatus at the timing when said second timer expires.

4. A communication system comprising:

the base station apparatus according to claim 3; and a mobile station apparatus that performs radio communication with the base station apparatus, wherein the mobile station apparatus includes:
  a use condition determination portion which determines conditions of use by a user;
  a notification portion which notifies said base station apparatus of a request for establishing radio connection and information indicating said conditions of use; and
  a control portion which receives a control signal from said base station apparatus to make transition to an idle state.

5. A radio communication method of a base station apparatus with a mobile station apparatus, comprising:
  acquiring, from said mobile station apparatus, a request for establishing radio connection and information indicating conditions of use of said mobile station apparatus;
  setting a first timer for a relatively long time, when said information indicating the conditions of use indicates use of said mobile station apparatus, and
  determining, when said information indicating the conditions of use indicates non-use of said mobile station apparatus, whether or not a third timer determining a period of time during which occurrence of packet communication is monitored expires, and setting said first timer for a relatively long time, when said third timer does not expire, and setting said first timer for a relatively short time, when said third timer expires; and
  starting up said first timer, at the time when transmission of a packet to said mobile station apparatus is completed, and transmitting a control signal to said mobile station to interrupt the radio connection to said mobile station apparatus at the time when said first timer expires.

6. A radio communication method of a base station apparatus with a mobile station apparatus, comprising:
  acquiring, from said mobile station apparatus, a request for establishing radio connection and information indicating conditions of use of said mobile station apparatus;
  setting, a second timer determining timing with which C-DRX (CONNECTED Discontinuous Reception) is started for a relatively long time, when said information indicating the conditions of use indicates use of said mobile station apparatus, and
  determining, when said information indicating the conditions of use indicates non-use of said mobile station apparatus, whether or not a third timer determining a period of time during which occurrence of packet communication is monitored expires, and setting said second timer for a relatively long time, when said third timer does not expire, and setting said second timer for a relatively short time, when said third timer expires; and
  starting up said second timer, when transmission of a packet to said mobile station apparatus is completed, and transmitting a control signal intermittently to said mobile station apparatus at the timing when said second timer expires.

* * * * *